May 16, 1967     A. C. MATESANZ     3,319,434
LOW TEMPERATURE REFRIGERATION AND GAS STORAGE
Filed March 14, 1966     2 Sheets-Sheet 1
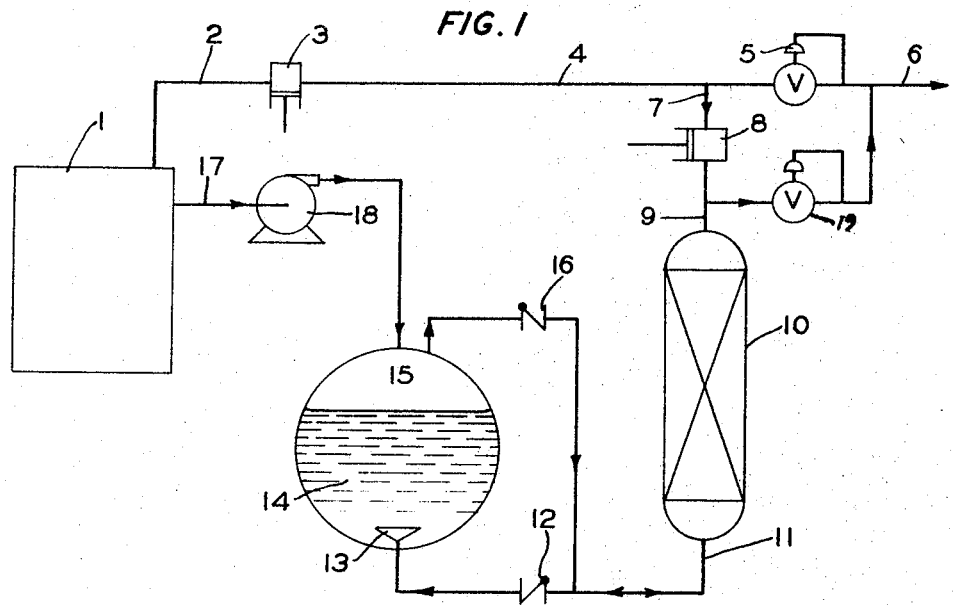
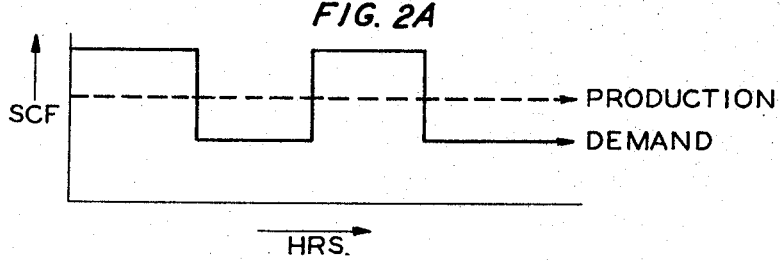
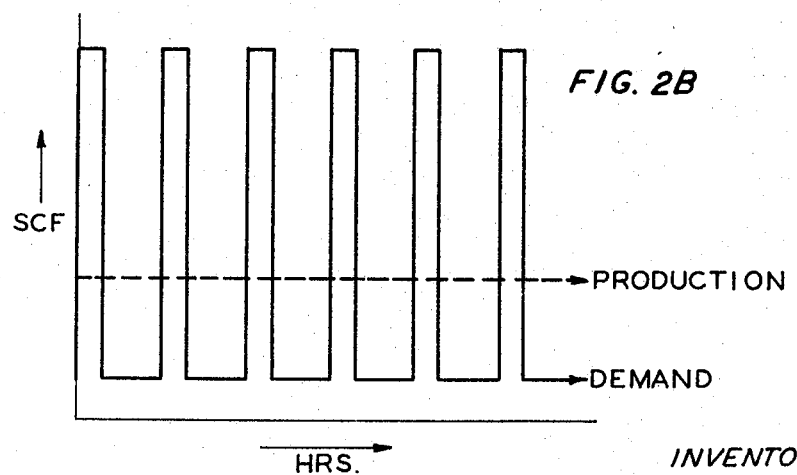
INVENTOR
ANGEL C. MATESANZ
BY
Jonathan Plaut
ATTORNEY

United States Patent Office 3,319,434
Patented May 16, 1967

3,319,434
LOW TEMPERATURE REFRIGERATION AND
GAS STORAGE
Angel C. Matesanz, Jersey City, N.J., assignor to Air
Reduction Company, Incorporated, New York, N.Y.,
a corporation of New York
Filed Mar. 14, 1966, Ser. No. 534,025
14 Claims. (Cl. 62—45)

This invention relates to the storage of gases with concomitant storage of low temperature refrigeration.

More particularly, this invention relates to the storing during low demand periods of gases produced at substantially a constant rate, and then delivering said gas when higher flow rates than the constant rate are required.

Many low temperature installations for the separation and/or supply of gases are subject to considerable variations in demand. For example, plants supplying oxygen to the steel industry often have a continuous output, while the demand from the Bessmer converters or other steel making processes change sharply at different times. Other gas supply systems such as natural gas transmission and distribution systems are also subject to fluctuations in demand. It is obvious that it is a waste of capital investment as well as a waste of power to design a plant with a capacity to match the peaks in the demand.

The storage of gases in a high pressure system at ambient temperature has been used for this purpose, but its cost is high when the peak or low consumption periods are long. The cost of low pressure gas storage is even higher. It has been generally agreed that the cheapest method of gas storage is the storage of liquefied gases in cryogenic storage systems, but if the liquid is stored and later vaporized the power required for liquefaction is wasted.

It is an object of this invention to provide a novel system for the storage of gases and low temperature refrigeration therefrom.

It is further an object of this invention to provide efficiently for periods of low and high customer demands of gas supplied at a constant rate.

It is further an object of this invention to provide apparatus for the low temperature storage of refrigeration, said refrigeration to be absorbed from a gas stream supplied to a customer from storage and imparted to said stream before storage thereof.

These and other objects and advantages of this invention will become more apparent upon reading of the following description.

The storage of gases according to this invention is accomplished at low temperatures under variable pressures inside a cryogenic vessel. These gases are stored in liquid state or as low temperature compressed vapors. Valuable low temperature refrigeration (latent heat and sensible heat of these gases) is stored in the system in a manner that will be particularly described hereinafter. During peaks in the demand these liquids and low temperature vapors transfer their refrigeration to the refrigeration storage system as they warm up and are discharged from the storage system. This stored refrigeration is absorbed at times of lower demand by the warm gases that flow into the gas and refrigeration storage system during low demand. Generally then, in the proposed system, gas is stored and refrigeration used during low demands. During peak demands, gas is used and refrigeration stored. During low gas demands, the excess of gas flows into the low temperature storage system, and is cooled down as it flows by absorbing the refrigeration accumulated in the system during the previous peak period. During the following peak in the demand gas flows out of the system, but the refrigeration contained in the gas is left behind in storage within the system. The refrigeration well is a low temperature regenerator packed with a material of high heat capacity per unit of volume.

My invention will now be described in more detail in association with the following drawings, in which:

FIG. 1 is a schematic view of my new system;

FIGS. 2A and 2B show two types of demand curves;

Figure 3:
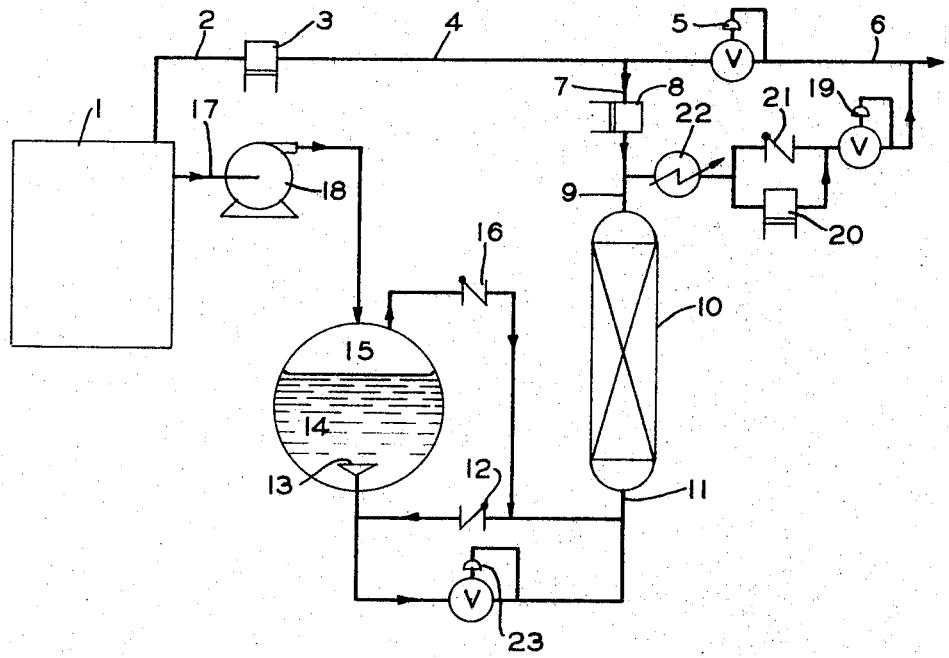
Figure 4:
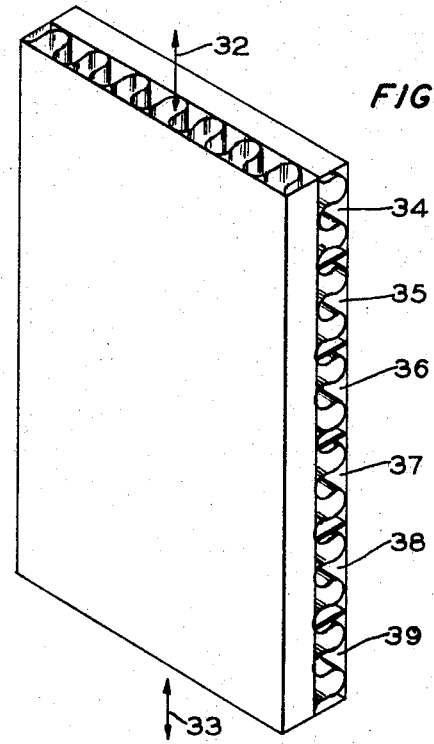

FIG. 2A indicates long low peaks in the demand followed by low demand periods of approximately the same length of time. FIGURE 2B indicates very high peaks of demand of short duration followed by longer periods of low demand;

FIG. 3 shows schematically a modification of the system shown in FIG. 1 providing adequate supply when dealing with demand of the type shown in FIG. 2B for time periods shown in FIG. 2A while reducing the size of the storage tank required; and FIG. 4 shows one design that could be used in a low temperature regenerator.

The gas source 1, such as for example, a low temperature gas separation plant, produces a continuous stream 2 of gaseous product and a small stream of liquefied gas product 17.

Compressor 3 compresses the gas fraction to a pressure greater than the required pressure in the supply line 6, controlled by pressure control valve 5.

During low demands in the supply line 6, the excess of gas available 7 is compressed by compressor 8 to a higher pressure and flows through the low temperature regenerator 10, check valve 12, and is injected under the liquid 13 in the storage tank 14.

The vessel 14 is a standard cryogenic (low temperature storage) vessel designed to operate at variable pressures. A part of the stored gas will condense and will be stored as a liquid. Another part of the gas will be stored as a compressed low temperature vapor. Vapor temperatures and pressures will approach equilibrium with the liquid stored in the tank. A very large amount of vapor can be stored in this way, that amount proportional to the mass of liquid in the tank and to the tank maximum working pressure.

During peaks in the demand, as shown in FIG. 2A, the vapor will flow out of the vapor space 15 of the tank. Additional amount of vapor then flashes off the liquid 14 that is in equilibrium with the vapor pressure above it. This low temperature vapor flowing out of the tank will transfer its refrigeration to the regenerator 10.

The cold vapor flows through check valve 16 and then through the regenerator 10. Valve 19 controls the pressure in the supply line and the flow of gas from the regenerator.

Compressor 20 in the embodiment shown in FIG. 3 allows reduction of the storage tank pressure to lower levels increasing in this way the gas storage capacity of the system.

In some installations a single compressor could be used with adequate piping and controls in place of the two booster compressors 8 and 20 shown in FIG. 3. This compressor would compress the gas flowing in or out of the regenerator. During low demands the performance of the system shown in FIG. 3 is the same as the system shown in FIG. 1. During peak demands the system of FIG. 3 includes two different directions for the gas flowing out of the regenerator.

At first when the pressure in the storage system 10 and 15 is higher than the required pressure in the supply line 6 the flow will take place through check valve 21 and control valve 19. When the pressure in the system becomes smaller than the required pressure at the supply line the compressor 20 will maintain the required flow and pressure to the supply line.

Another feature of this system shown in FIG. 3 is the possibility of using also the regenerator as a liquid vaporizer to supply gas after extended periods of peak demands. A control valve 23 will open the liquid flow when the pressure decreases to a certain level. A great part of the refrigeration from liquid vaporization may be stored in the regenerator and used later to liquefy the incoming higher pressure vapors during the following period of low demand. A supplementary steam heated heat exchanger 22 may be used to prevent too low temperatures in the supply line after long periods of peak demand.

A small fraction of the plant output in liquid state is transferred to the storage tank with a transfer pump 18. This small amount of liquid is required to make up refrigeration loss due to less than perfect efficiency, and it may be supplied by the stream 17 and/or shipped from another plant.

The tower or low temperature regenerator 10 is packed with a material of high heat capacity per unit of volume. Packing materials are selected preferably from inexpensive materials with high densities and specific heats. Different varieties of crushed rock may be used as packing in this conventional type regenerator in which only the sensible heat of the packing is used for the storage of refrigeration.

A great increase in the refrigeration storage capacity per unit of volume will be achieved with regenerators of a special design, to be described in detail.

FIG. 4 shows a preferred section of a special design regenerator in which the latent heat of fusion of substances with melting point temperatures at different levels is used. Standard design regenerators use only the sensible heat of the packing material for the storage of refrigeration. This type of regenerator will store a greater amount of refrigeration per unit of volume than standard designs, and will be filled with substances with melting points at different temperature levels.

These substances will be selected from various materials with a low price, adequate melting point temperature, high latent heat of fusion, high specific heat, high density, and low vapor pressure at room temperatures.

During the peaks in the demand the cold vapor from storage flows in at 33 (in FIG. 4) and warms up by transferring its refrigeration first to a substance in section 39 with a freezing point temperature close to the boiling point of the vapor. Then it transfers its refrigeration to other substances with succeedingly higher freezing points stored in sections 38, 37, 36, 35 and 34 of the regenerator. The gas comes out at 32 after warming up to a point close to room temperature. The following chart illustrates substances that could be used at each section. The substances set forth in the chart are of course given purely in example.

| Section | Melting Point, °F. | Substance |
| --- | --- | --- |
| 39 | −295 | Freon 13. |
| 38 | −256 | Freon 22. |
| 37 | −211 | Freon 21. |
| 36 | −137 | Freon 114. |
| 35 | −82 | Chloroform. |
| 34 | −12 | NaCl+BaCl$_2$ (in ice). |

During low demands, the gas flows into the storage system through 32 and is cooled down by absorbing the refrigeration stored in the frozen substances in sections 34, 35, 36, 37, 38 and 39, and flows out of the regenerator at 33 at temperatures close to the boiling point of the vapor and is injected under the liquid in the storage tank 14.

Whenever a reference has been made to oxygen and nitrogen, it has been done by way of example. The same low temperature storage system and principles would apply to other cryogenic vapors and fluids that liquefy at different temperature levels. Furthermore, whenever a reference has been made to specific type of regenerators, or other equipment or specific equipment and controls arrangement, it is understood that this system, exemplified by the attached drawings, is susceptible to modifications required to adapt it to the storage of many types of fluids under different conditions and variable capacities and demand curves. Consequently, this invention is not limited to any equipment, apparatus, system, or method described hereinbefore except as set forth in the following claims.

I claim:

1. A low temperature gas storage process comprising storing a portion of a gas supplied at a steady state by a supply facility during periods of low customer demand in a storage device, passing said portion before storage through a low temperature regenerator, during periods of high customer demand directing vapor out of the storage device, circulating said directed vapor through said regenerator, and supplying the vapor directed from the storage device through the regenerator to the customer.

2. A low temperature gas storage process as recited in claim 1, further comprising absorbing heat from the portion passing through the regenerator at successive levels in the regenerator, and delivering said heat from said successive levels of the regenerator to the vapor circulating through the regenerator and then supplied to the customer.

3. A process for the utilization and storage of refrigeration from a gas supplied at a constant rate but demanded by the customer at a varying rate from low to high demand, comprising the steps of during periods of low demand passing gas through a low temperature regenerator into a storage tank, cooling said gas in said low temperature regenerator, during periods of high demand directing gas out of the storage tank to the regenerator, cooling the regenerator with the low temperature gas from the tank and then passing the gas from the regenerator to the customer.

4. A low temperature gas storage process as recited in claim 3, further comprising holding the gas in the storage tank in an equilibrium liquid and gas condition.

5. A low temperature gas storage process as recited in claim 3, further comprising liquefying the gas in the regenerator during low demand periods as the gas is directed into the storage tank, and vaporizing liquid from the storage tank as it passes through the regenerator during peak demands.

6. A process as described in claim 4, further comprising replenishing lost refrigeration by directing liquid to the storage tank.

7. A process as described in claim 4, further comprising passing liquid from the storage tank to the regenerator for supply therefrom to the customer during periods of high customer demand.

8. A method of utilizing a regenerator with packing therein for storage of refrigeration from a vapor of a liquefied gas comprising the steps of directing a cold vapor from a storage device, transferring refrigeration value from the cold vapor to the regenerator packing as the cold vapor is heated, directing said vapor from said regenerator to the customer, passing gas supplied from a supply facility to the regenerator, cooling said vapor with the refrigeration value stored in the regenerator as the regenerator packing is heated, and circulating the cooled vapor to the storage device.

9. A method as recited in claim 8, further comprising transferring said refrigeration value from and to said packing in a series of steps depending on the constantly varying refrigeration storage capacity of the packing.

10. A low temperature gas storage and supply system to be used in association with a facility supplying a gas at steady state conditions, comprising means directing the gas to the customer, additional means for directing and storing at least a portion of the gas from said first means when customer demand is below the steady state supply, said additional means comprising regenerator means, storage means, means interconnecting the regenerator means and storage means, and means connecting the regenerator means to the first-mentioned means for direction of the gas through the regenerator to the storage means for storage during periods of low demand and from the storage means through the regenerator to the customer for supply during periods of high demand.

11. A system as described in claim 10, said regenerator means including packing means comprising at least several levels of packing material, each having successively refrigeration storage capacity at a lower temperature level.

12. A system as described in claim 11, further comprising means for independently supplying liquid to the storage means.

13. A system as described in claim 11, further comprising means for independently supplying liquid from said storage means to said regenerator means for direction to the customer.

14. Regenerator means comprising a column, said column including therewithin at least two succeeding layers of packing material, each layer of packing material of a decreasing melting point temperature such that said succeeding layers of packing material efficiently absorb refrigeration at particular temperature levels from a cold vapor passing therethrough on the way to a customer from storage as the vapor arrives from the preceding layer of packing material and such that said succeeding layers of material refrigerate the vapor to successively lower temperature levels as it passes through the regenerator toward storage.

References Cited by the Examiner

UNITED STATES PATENTS

| | | | |
|---|---|---|---|
| 2,456,889 | 12/1948 | Olson | 62—51 |
| 3,091,096 | 5/1963 | Rendos et al. | 62—52 |
| 3,195,316 | 7/1965 | Maher et al. | 62—52 |
| 3,271,967 | 9/1966 | Karbosky | 62—55 |
| 3,273,349 | 9/1966 | Litvin et al. | 62—52 |

LLOYD L. KING, *Primary Examiner.*